United States Patent [19]
Keller, III

[11] 3,952,764
[45] Apr. 27, 1976

[54] SINGLE LEVER FAUCET CONSTRUCTION
[75] Inventor: Robert J. Keller, III, Richmond, Va.
[73] Assignee: Kel-Win Manufacturing Co., Inc., Chester, Va.
[22] Filed: June 19, 1974
[21] Appl. No.: 480,848

[52] U.S. Cl. ............................. 137/119; 137/315; 137/454.6; 137/636.1; 285/158
[51] Int. Cl.² .......................................... F16K 11/14
[58] Field of Search ............. 137/636, 636.1, 636.2, 137/607, 315, 119; 74/471 XY

[56] References Cited
UNITED STATES PATENTS

| | | | |
|---|---|---|---|
| 1,573,210 | 2/1926 | Whidden | 137/636.2 |
| 3,384,121 | 5/1968 | Spencer | 137/636.2 X |
| 3,623,510 | 11/1971 | Hare et al. | 137/607 X |
| 3,812,875 | 5/1974 | Buhler | 137/636.1 X |

*Primary Examiner*—Martin P. Schwadron
*Assistant Examiner*—Richard Gerard
*Attorney, Agent, or Firm*—Warren N. Low; Richard P. Matthews

[57] ABSTRACT

A single lever faucet construction utilizing a removable cartridge assembly and improved force balance and friction control on an operating ball cam member. A pair of valve members are mounted in the cartridge in side-by-side relationship with cam follower control means therefor and means to effect vertical adjustment to compensate for both tolerance variations and wear of parts. An underbody member and adapter therefor with three passageway inlets permits the use of a diverter valve and sink spray arrangement in a single installation.

24 Claims, 15 Drawing Figures

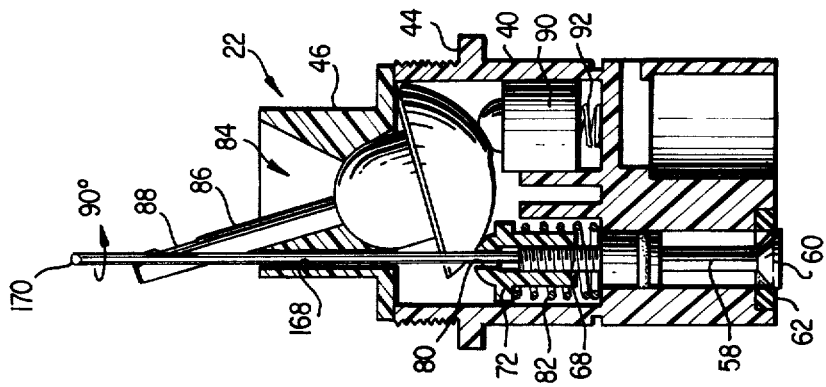
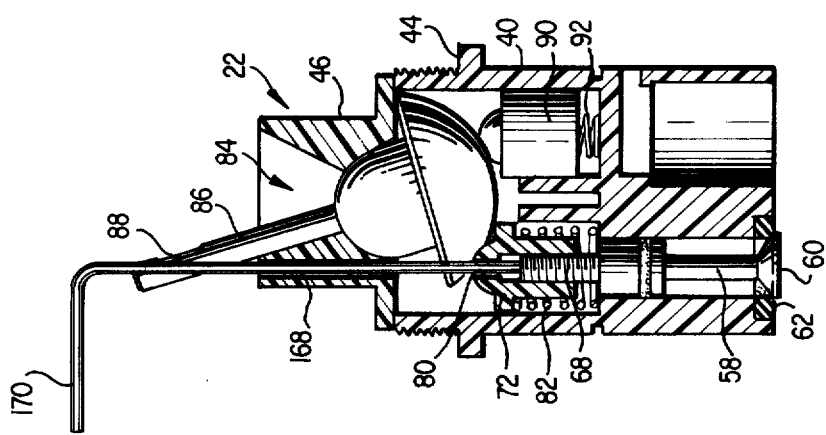
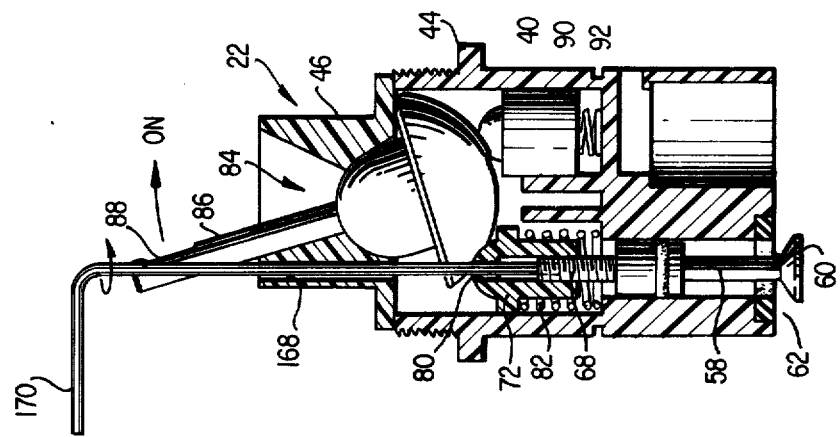

SINGLE LEVER FAUCET CONSTRUCTION

This invention relates to a single lever faucet construction and, more particularly, to a single lever faucet construction made primarily from molded plastic parts having improved force balance and friction control means as well as means for compensating for both tolerance variations and worn parts.

One of the difficulties encountered in single lever faucet constructions is the maintenance of a substantially constant pressure on an operating cam member so that the actuating force required to move a handle throughout the operating range of the faucet remains constant. Improper force balance or friction controls can result in the handle member being snapped to a closed or off position from a preceding position of substantial volume or being turned from an off position to a position of too much volume or in simply not effecting satisfactory gradations in the flow of water throughout the operating range of the faucet.

Another serious limitation of presently known single lever faucet constructions is the inability or incapacity of making adjustments in the operating valve members in order to compensate either for tolerance variations in the size of the original parts or the capacity to make adjustments after the faucet has been put into use in order to compensate for dimensional changes brought about by wear of the parts.

In accordance with the present invention the foregoing shortcomings and limitations are effectively overcome by the provision of a removable cartridge assembly with a cam follower arrangement for an operating ball cam member which provides improved operating force balance and friction control. Thus, the force required to move the ball cam member and thereby operate the faucet remains substantially constant throughout its operating range. Not only is there no tendency for the handle control member to snap to a closed or off position, but it is also possible to obtain fine gradations of volume control throughout the operating range for the faucet. A ball cam retaining member through which a lever used to operate the ball cam member extends is made rectangular in plan view whereby the faucet may be turned on and off at a substantially constant temperature by straight reciprocatory movement of the lever.

By utilizing valve members mounted vertically in side-by-side relationship and under control of a pair of cam follower members threadedly received on the stems of the valve members themselves, it becomes possible to effect vertical adjustment of the cam follower members with respect to the bottom of the ball cam member. This is achieved by providing suitably aligned apertures in the pair of cam follower members and a cam retaining member through which the operating lever extends. The ball cam member is movable to a position in which it no longer obstructs the aligned apertures whereby a tool member may be inserted to effect vertical adjustment of the cam followers relative to the bottom of the ball cam member when the removable cartridge is in its assembled position.

A plastic underbody member and a plastic inline adapter therefor are each provided with three separate and distinct passageways whereby a diverter valve may be utilized in the removable cartridge member in order to supply a sink spray member within the single underbody member. For convenience of attachment, the adapter member has three lower leg members each in fluid communication with one of the internal passageways in the adapter member. The adapter is oriented with respect to the underbody member and a sealing ring member is retained between the inner face of the underbody member and the adapter member to effect sealing between the mating internal passageways of the underbody member and the adapter member.

Because the diverter valve is mounted directly within the removable cartridge rather than on the end of the spout, this arrangement makes it possible to eliminate the need, with its concomitant cost, for a tube inside the spout itself.

The inherent advantages and improvements of the present invention will become more readily apparent upon considering the following detailed description of the invention and by reference to the drawings in which:

FIGS. 7–9 are elevational views of the removable cartridge member of FIG. 1 illustrating the method of adjusting one of the valve members;

Figure 1:
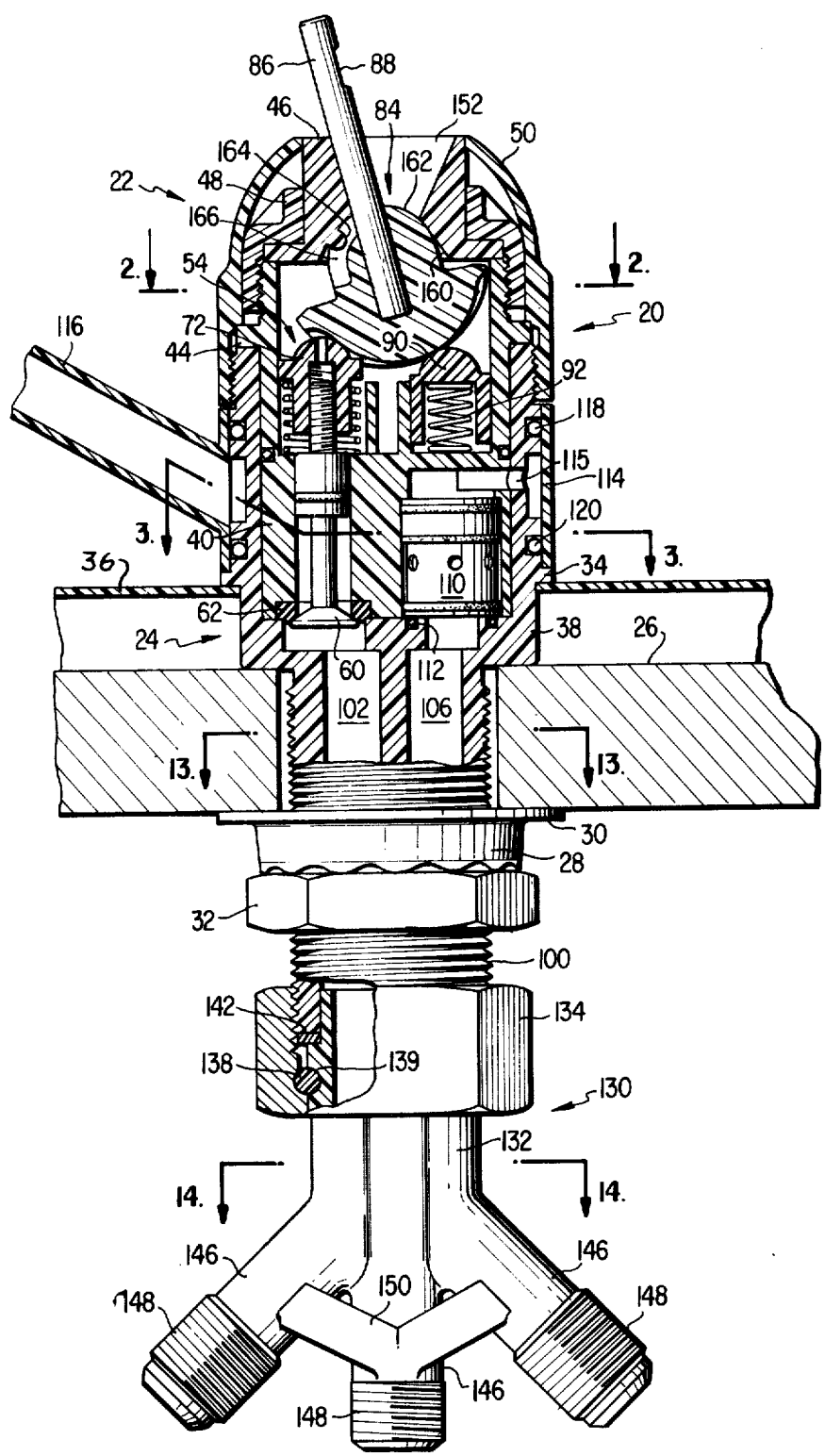
FIG. 1 is a fragmentary elevational view taken partially in vertical cross section illustrating the single lever faucet construction of the present invention.
Figure 2:
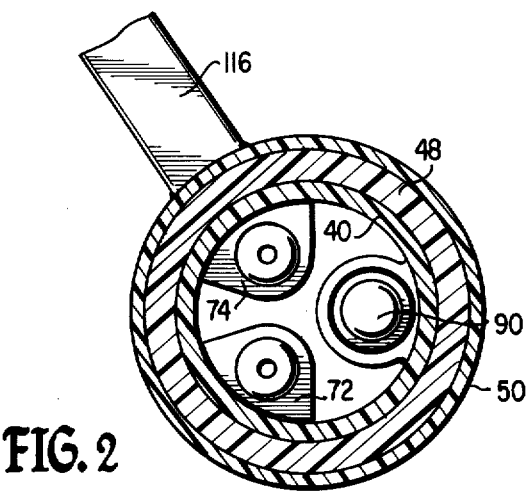
FIG. 2 is a fragmentary plan view taken in horizontal cross section along line 2—2 of FIG. 1.

Referring now to FIG. 1 of the drawings, there is illustrated a single lever faucet illustrated generally at 20 with a removable cartridge member therefor indicated generally at 22. The removable cartridge member 22 is inserted into an open-mouthed socket construction of an underbody member indicated generally at 24. The assemblage is shown in FIG. 1 to be mounted vertically and attached to a sink 26 by means of lock nut 32 which holds a crowfoot washer 28 having an integral flange 30 against the bottom of the sink.

In mounting the assemblage, the procedure is to thread lock nut 32 onto the underbody 24 until the flange 34 on the underbody member initially contacts a plastic cover 36 and is drawn down until the shoulder 38 contacts the top of the sink 26. The height of the distance between the cover 36 and the top of sink 26 is the same as the height of flange 38. This permits the establishment of a controlled compression on the plastic cover 36.

The removable cartridge member 22 comprises a cartridge casing member 40 which has a substantially cylindrical body portion received in the open-mouthed socket 42 (FIG. 6) of the underbody member 24. A flange 44 on the cartridge casing member 40 is provided with clearance above an open-mouthed socket 42 of the underbody member 24 to permit engagement and compression of washers 62 of the valve members to be described in detail hereinafter. Washers 62 are compressed at the bottom of the open-mouthed socket in underbody member 24.

A ball cam retainer member 46 rests atop the open cylindrical end of cartridge casing member 40 and is retained by an inner cap 48. An outer cap 50 has an inner shoulder which engages the upper surface of flange 44 when its internal threads are threaded sufficiently upon the external threads of the underbody member 24 as illustrated in FIG. 1. The outer cap 50 has a circular opening designated at 52 in FIG. 6 and is intended to receive the upwardly extending cylindrical wall of ball cam retainer 46.

Figure 6:
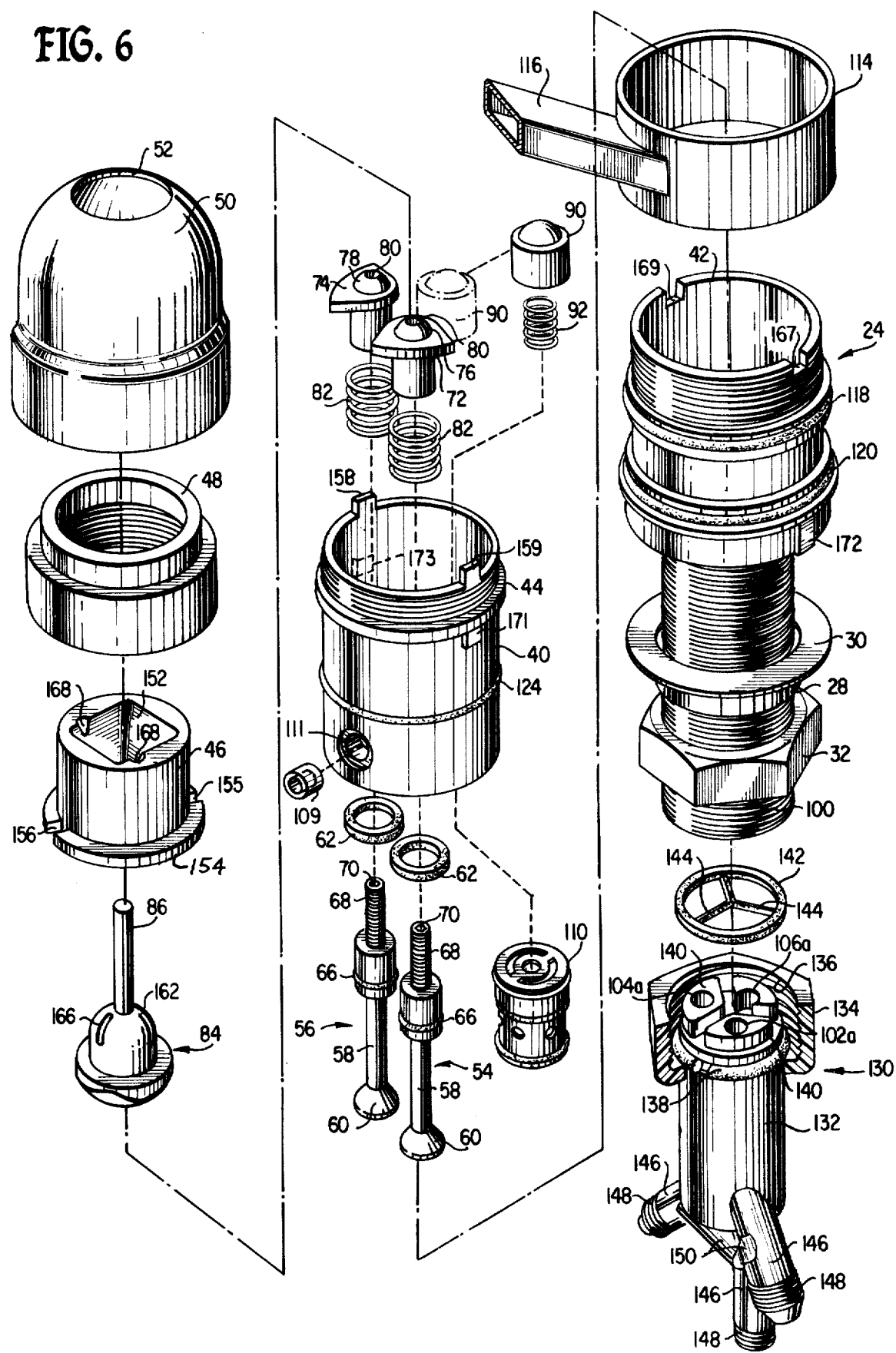
FIG. 6 is an exploded perspective view of the valve shown in FIG. 1.
Figure 10:
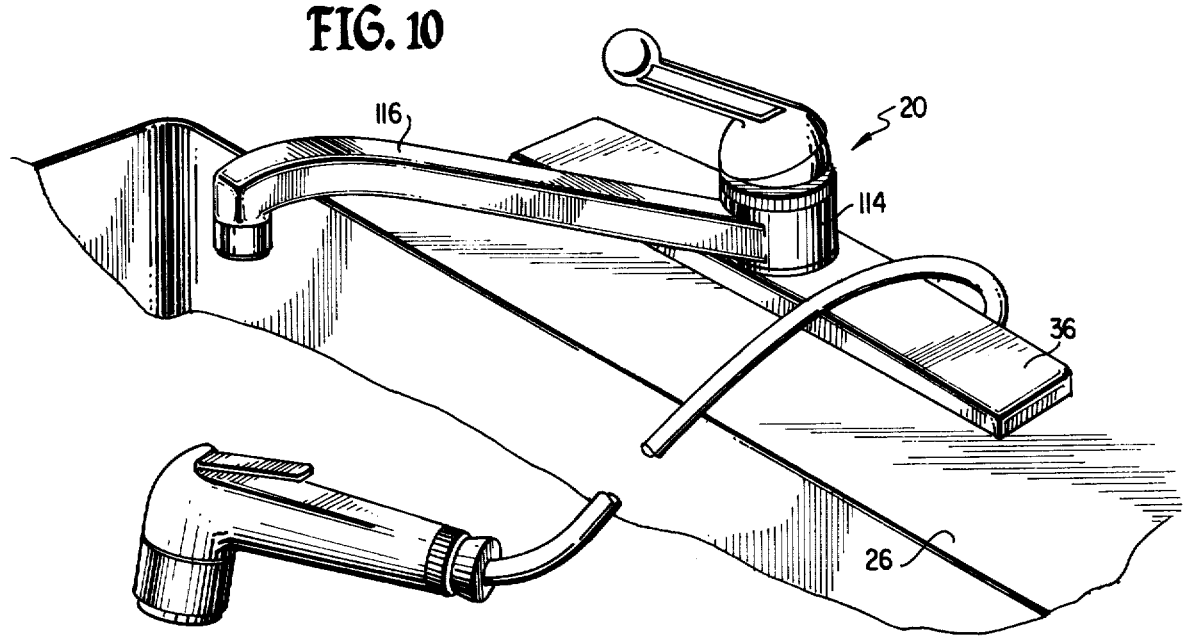
FIG. 10 is a perspective view of the single lever faucet mounted on a sink.

A pair of valve members are indicated generally at 54 and 56 in FIG. 6 each of which is provided with a stem member 58 having a conical sealing head at 60 each of which is adapted to be seated against valve washers 62 frictionally retained and compressed within the lower cylindrical portion of the cartridge casing member 40.

Figure 4:
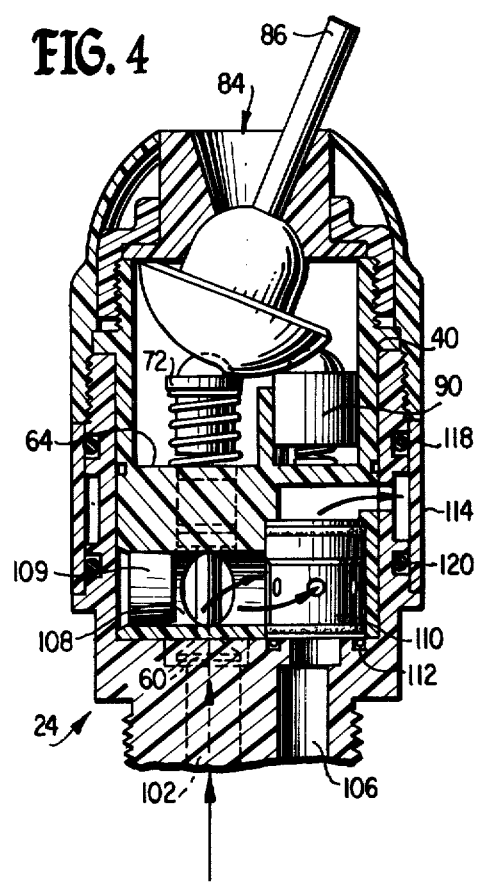
FIG. 4 is a fragmentary elevational view taken in vertical cross section and similar to that shown in FIG. 1 but showing an open valve position.
Figure 5:
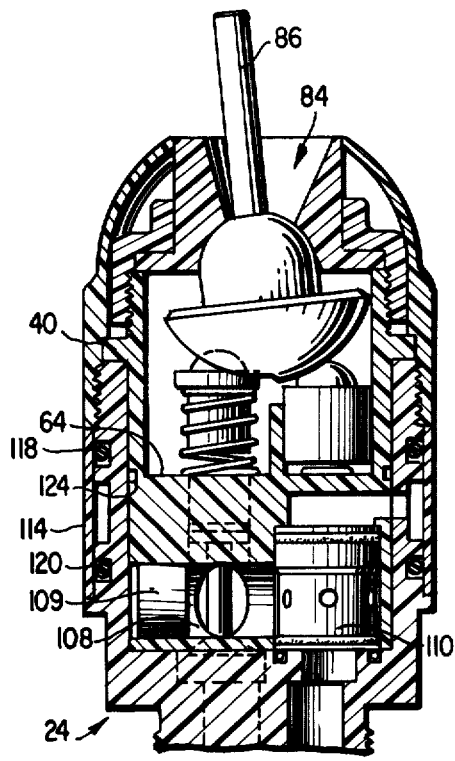
FIG. 5 is a fragmentary elevational view taken in vertical cross section and similar to that shown in FIG. 4 but showing a closed valve position.

The cartridge casing member 40 is provided with an inner platform or shelf designated at 64 in FIGS. 4 and 5 beneath which bores extend to receive a piston-like portion of the stem which is provided with an O-ring 66 to ensure that water will not advance above the level of platform 64. The upper portions of the stem members 58 are externally threaded at 68 with these portions of the stem being hollowed out as is illustrated most clearly at 70 in FIG. 6 in order to receive a tool member for purposes which will become more evident hereinafter.

A pair of cam follower members 72 and 74 are illustrated in FIG. 6 with one of these cam members being seen in each of FIGS. 1, 4 and 5. These cam follower members 72 and 74 are provided with cam-engaging surfaces 76 and 78 in FIG. 6 and with apertures 80 in each of the cam follower members. Each cam follower member is spring mounted by means of springs 82 which are disposed within suitably provided upstanding walls within the cartridge casing member 40.

A ball cam member is indicated generally at 84 in FIGS. 1 and 4–6 with a lever member 86 attached thereto in order to move the cam to its desired position in order to operate the faucet. It will be observed that the ball cam retainer member 46 provides a first cam restraining means serving to prevent outward movement of the cam and a series of three cam follower members including cam followers 72, 74 and a false or compensating cam member 90 provides a second ball cam restraining means serving to prevent inward movement of the ball cam member. Thus the cam member is capable of being moved manually about a pair of intersecting axes but cannot translate or move in a vertical plane. The cap member 46 is oriented both with respect to the cam member 84 and with respect to the cylindrical cartridge casing member 40. For example, the ball cam retainer member 46 and ball cam member 84 carry cooperating male and female members in the form of a projecting male member 164 and a slot 166 in order to orient the ball cam member 84 with respect to the ball cam retainer member. It will be explained later in the specification how the ball cam retainer member is oriented with respect to the centerline of the cartridge casing member 40.

The lever member 86 is provided with orienting means in the form of a slot 88 in order to orient the handle attachable to lever 86 with respect to the cam member 84. A compensating or false cam member is provided at 90 spring mounted by means of spring 92 and disposed within the cartridge housing member 40 by suitable upstanding wall projections from the platform 64. This compensating or false cam follower member 90 is constantly in engagement with the cam member 84 and serves to counterbalance the forces on the cam member 84 by the pair of cam follower members 72 and 74 and to prevent an inadvertent change of position of the cam member. It was found that unsatisfactory change of positions occurred without the use of the false or compensating cam follower member 90 when either or both valves are in any given open position.

Figure 3:
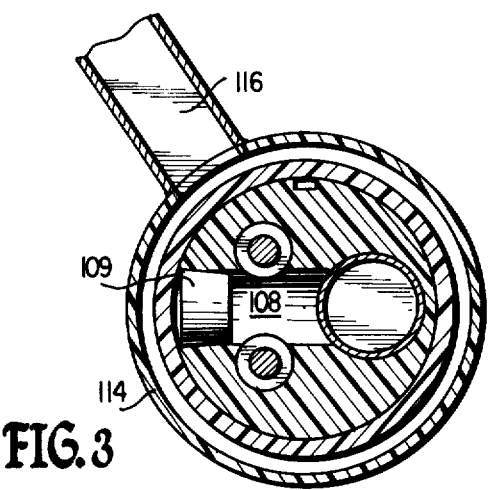
FIG. 3 is a fragmentary plan view taken in horizontal cross section along line 3—3 of FIG. 1.
Figure 13:
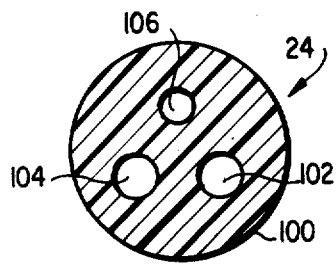
FIG. 13 is a plan view taken in horizontal cross section along line 13—13 of FIG. 1.
Figure 14:
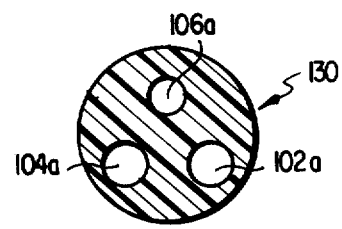
FIG. 14 is a plan view taken in horizontal cross section along line 14—14 of FIG. 1; and, FIG. 15 is a perspective view, schematic in nature, illustrating the method of developing the elevational contour for the ball cam member.

Referring to FIG. 1, it will be seen that the underbody member 64 has a lower threaded portion 100 the cross section of which as is illustrated in FIG. 13 contains a set of three separate and distinct passageways. Passageway 102 and passageway 104 lead to sources of cold and hot water and passageway 106 is a return conduit from a diverter valve 110. The diverter valve, per se, is conventional insofar as the present invention is concerned and may, for example, be of the type illustrated in U.S. Pat. No. 3,376,884 to Bucknell et al. issued 4/9/68. Water, from a source not shown, passes through passageways 102 and 104 to the valve members 54 and 56, respectively. With one or both of the valves being open, dependent upon the position of ball cam 84, water passes the conical sealing head 60 into a mixing chamber 108 as is best seen in FIGS. 3, 4 and 5. The flow of water is indicated by the arrows in FIG. 4. A plug 109 closes an opening 111 in the cartridge casing member 40 which makes the molding of this element easier and possible and is required to direct all the blended water through the diverter valve to make it operate properly. Plug member 109 is frictionally received within the cylindrical opening in cartridge casing member 40 and is not used when the diverter valve is not used. In the latter event, hole 106 is not required and is molded closed either in the underbody 24 or in the aligned hole in adapter 130.

The diverter valve 110 is seated above a circular O-ring received in a groove 112 in underbody at FIG. 1, provided therefor to restrict the passage of water.

A spout hub 114 and spout 116 constitute spigot means for the faucet with O-rings at 118 and 120 ensuring that water which passes from the diverter valve into and through opening 115 in FIG. 1 does not leak. When the diverter valve 110 is not used, plug 109 (FIG. 6) is also not used and water discharges from both openings 115 (FIG. 1) and the unplugged opening 111 (FIG. 6). An O-ring is also provided at 124 in a groove within the outer wall of cartridge casing member 40 to effect a seal between the cartridge 40 and the inner wall of the underbody member 24.

Referring again to FIG. 1, an adapter member is indicated generally at 130 having a generally cylindrical body 132 and is connected to the threaded portion 100 of the underbody member 24 with the aid of a nut 134 which is internally threaded as shown at 136 in FIG. 6. The nut 134 carries a plastic snap ring 138 which fits in groove 139, FIG. 1, to effect a strong rotatable connection between nut 134 and adapter body 132.

As best seen in FIG. 6, the adapter 130 is provided with three upstanding boss members 140 with a sealing ring member 142 efffecting a seal at the interface between the bottom of threaded portion 100 of underbody member 24 and the adapter 130. For this purpose the sealing ring member 142 has a circular peripheral portion and a plurality of web sealing means 44 which reside in the spaces between the upstanding boss members 140.

The adapter 130 has a set of three lower leg members 146 the ends of which are threaded at 148 in order to secure attaching means for the input conduits to the hot and cold water and the output conduit for the discharge from diverter valve 110. Other types of conventional water faucet supply connections can also be used. Webbing is shown at 150 between the lower leg members 146 for added strength.

Referring now particularly to FIG. 6, the ball cam retainer member 46 is provided with a central opening at 152 which is rectangular in plan view. This makes it possible for the mixing faucet to be turned on and off at a substantially constant water temperature by straight reciprocatory movement of the lever member 86. Some mixing valves require the user to set the blended water temperature each time the valve is turned on. The ball cam retainer 46 has an annular flange 154 which is provided with means to orient the ball cam retainer 46 with respect to the cartridge casing member 40. One specific form of orienting means is illustrated which consists of two different sized notches 155 and 156 in the annular flange 154 which mate with two upstanding tabs 158 and 159 (FIG. 6) on the top wall of the cartridge casing member 40, thus permitting the ball cam retainer 46 to be assembled to the cartridge 40 in only one position. The orientation which is effected ensures that the ball cam retainer member 46 and the ball cam member 84 itself is oriented with respect to the vertical centerline of the cartridge casing member 40.

Numerous other orienting means are employed for the single lever faucet of the present invention. For example, referring to FIG. 1, ball cam retainer 46 is provided with an orienting tab 164 which is received in a slot 166 in ball cam 84. The slot in ball cam 84 is seen in both FIGS. 1 and 6.

In addition, underbody member 24 is provided with slots 167 and 169 (FIG. 6) to receive a mating pair of projection lugs on the cartridge casing member 40 one of which lugs is shown at 171 and the other in phantom at 173. Orientation may be effected by offsetting the location of the locator means around the periphery of the members or by making the slots and lugs of different sizes, respectively. Other orienting means may be employed.

Ball cam retainer 46 is also provided with a pair of holes 168 as is best seen in FIGS. 7, 8 and 9 with these holes 168 being in vertical alignment with the apertures 80 in the cam follower members 72 and 74. Thus it becomes possible to adjust the clearances between cam followers 72, 74 and the bottom of the ball cam member 84 by inserting a tool member, for example, an Allen head hexagonal wrench which is received in a corresponding hexagonal opening 70 in the stem members 58 as seen best in FIG. 6. In order to compensate for variations in tolerances of the parts during the initial assembly of valve parts or to compensate for wear from use of the parts, the tool member 170 permits vertical adjustment of the cam members 72 and 74 on the stem members 58 relative to the working faces of ball cam member 84. The procedure is to turn either the hot or cold valve to the off, full hot or full cold position, insert the Allen wrench in hexagonal opening 70 in stem member 58. If water is being discharged from end of spout member 116, rotate the wrench counterclockwise until water just stops discharging from end of spout member 116. At this point, the conical sealing head 60 has just seated on valve washer 62. Rotate the stem counterclockwise an additional one quarter turn which backs the cam follower 72 or 74 away from the ball cam 84 and establishes a known amount of clearance between the two parts.

Repeating the above procedure if it is noted that water is not being discharged from the end of spout member 116, the Allen head wrench is turned in a clockwise manner until dripping is noted at spout member's end. At this point the top of cam member 72 or 74 has just contacted the bottom of ball cam member 84 and the conical sealing head 60 has barely separated from valve washer 62. Rotate stem counterclockwise an additional one quarter turn as described above to establish the same known clearance between bottom of ball cam 84 and top of cam follower 72 or 74.

Repeat the above procedure with the second valve in the valve cartridge.

For example, using a 10-32 thread, one-quarter turn equals 0.008 inches. While the ball cam 84 normally occludes the space between the apertures 168 in the ball cam retainer 46 and the aperture 80 in cam follower members 72 and 74, the ball cam is capable of being turned either to a full off hot or full off cold position in which the tool 170 can be inserted through 168 and clear the ball cam member 84 through the aperture 80 of the cam follower members and into the hexagonal opening 70 in stem members 58. This procedure of making the adjustments in an off condition differs from the procedure in my U.S. Pat. No. 3,241,810, issued Mar. 22, 1966, when the valve was adjusted in a "cracked" position, that is, with a small stream of water passing the valve seat.

Figure 11:
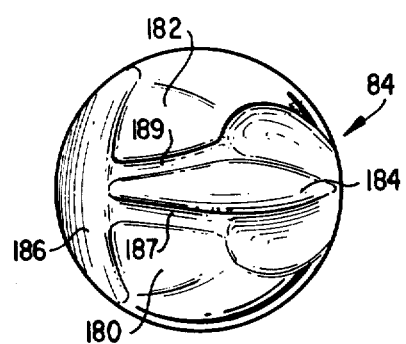
FIG. 11 is an enlarged bottom plan view of the ball cam member.
Figure 15:
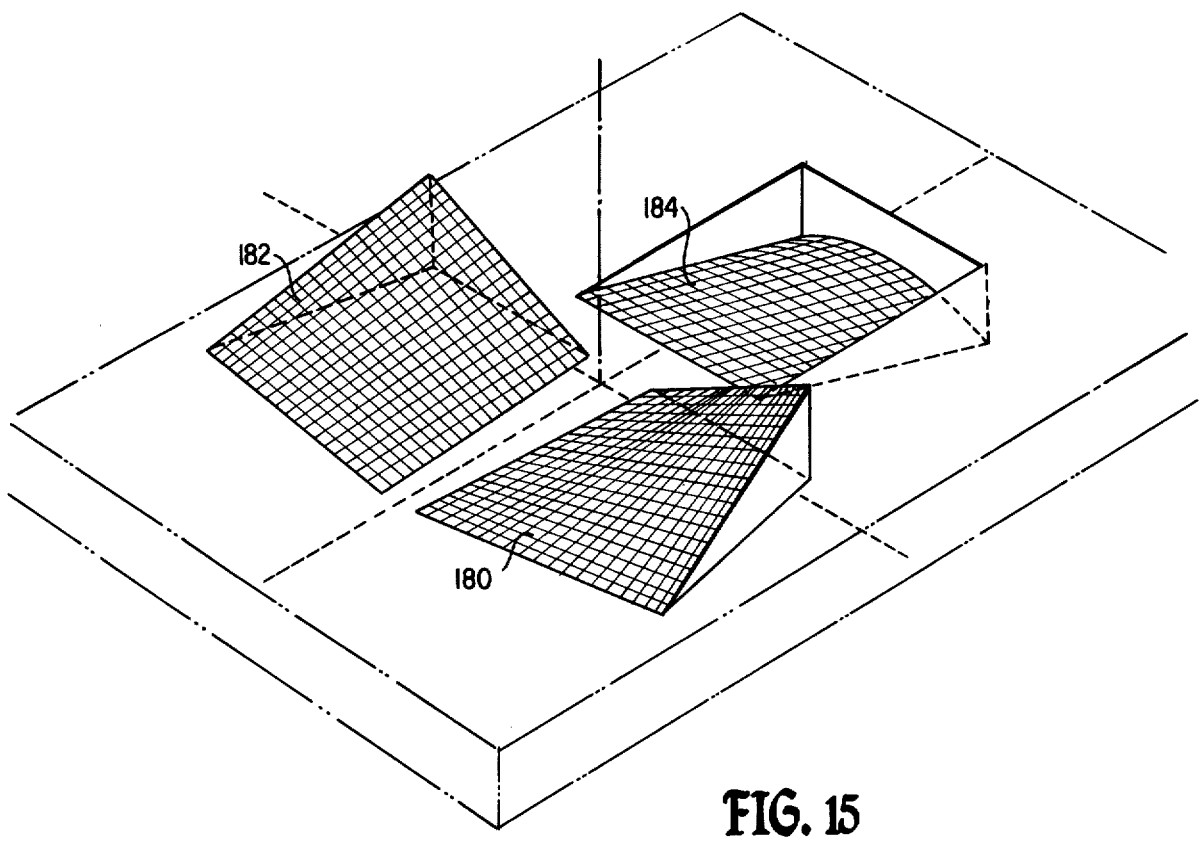

Turning now to FIGS. 11 and 15, there is shown in FIG. 11 the underside of the ball cam 84 in which working cam surfaces 180 and 182 are provided for engagement with cam followers 72 and 74, respectively. These cam surfaces are developed and molded onto a spherical cam member although the development is shown schematically and projected onto a plane surface in FIG. 15 as the surfaces 180 and 182. Similarly, a working surface 184 is provided for the spring-loaded compensating cam or false cam 90 which is constantly in engagement with the ball member 84 and serves to counterbalance the forces on the cam member 84 by the pair of spring-loaded cam follower members 72 and 74 and to prevent an inadvertent change of position of the ball cam member 84.

Figure 12:
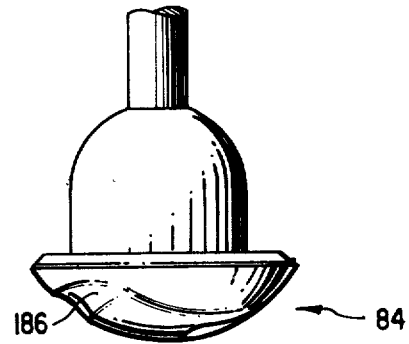
FIG. 12 is an enlarged side elevational view of the ball cam member.

As a special feature, a groove 186 on ball cam member 84 (FIGS. 11 and 12) provides clearance for all full off positions, hot and the cold water positions, or when the valve is on in all cold positions at 187 or all hot position at 189. These grooves are of the order of magnitude of 0.008 inches and they assure a fully closed condition for the faucet in all fully off positions. The variations in the working surfaces 180 and 182 as well as for the compensating cam surface 184 are such as to ensure a substantially uniform change of rate of relative areas of valve openings or when moving from one position to another.

When the ball cam member 84 is moved from the fully off hot position (at one extremity of groove 186) to the fully off cold position (at the other extremity of groove 186) clearance exists between the tops of both cam followers 72 and 74 and the groove 186. Thus both valves are in the fully closed position. When either valve is turned to an on position in either the all hot or all cold condition, one cam follower is in contact with surface 180 or 182 on the ball cam and clearance exists between the other cam follower and grooves 189 or 187 respectively on the face of the ball cam 84. The compensating cam member 90 is always in contact with 184 on ball cam 84.

It will be observed also that the ball cam member 84, the pair of cam follower means 72, 74, the ball cam retainer 46, inner cap member 48, the compensating cam member 90 and the cartridge housing member 40 are all made from plastic materials. The plastic chosen for a given part is dependent upon the wear which the particular part will experience. The ball cam member 84, for example, is subjected to wear in a somewhat random fashion and therefore may be selected from a material such as Celcon which is an acetal copolymer manufactured by Celanese Plastics Company of Newark, N.J. Another factor to be considered in selecting a particular plastic for a particular part is the material's moisture absorption capacity. Plastic materials with high moisture absorption qualities are generally not dimensionally stable. Plastic materials that are not degraded by long term service in hot water must also be used for parts constantly immersed in water. The static and dynamic coefficients of friction between bearing parts must also be carefully considered. Thus it is preferable to chose dissimilar plastics between the ball cam, and the compensating cam and cam follower members, and the cam retainer. Various low moisture absorption grades of nylon materials may be employed because of their good wear characteristics.

Ideally, a type 6/12 nylon containing a small percentage of a continuous boundary lubricant such as silicone or polytetrafluoroethylene or a combination of both provides outstanding wear and frictional properties for parts such as the ball cam 84. Parts such as the ball cam retainer 46, the cam followers 72 and 74 and false cam 90 can be made using internally lubricated Celcon. Thus the total system of plastic moving parts is internally lubricated and dissimilar plastic materials are bearing one against the other. Obviously, other combinations of plastic materials are possible. Other possibilities include "Tenite" manufactured by Eastman Chemical Company, a polyterephthalate material or "Valox" supplied by General Electric Company, which is a thermoplastic polyester resin.

While presently preferred embodiments of the invention have been illustrated and described, it will be recognized that the invention may be otherwise variously embodied and practiced within the scope of the claims which follow.

What is claimed is:

1. A single lever mixing faucet construction comprising:
   a. a fixedly mounted underbody member having an open-mouthed socket at one end adapted to receive a removable cartridge therein,
      1. said underbody member being in fluid communication with sources of hot and cold water,
   b. a removable cartridge member at least partially received in said socket of said underbody member,
   c. means for retaining said removable cartridge member in said socket of said underbody member,
   d. said removable cartridge member comprising:
      1. a cartridge housing member,
      2. a cam member mounted within said cartridge housing member for substantially universal motion about a pair of intersecting axes,
      3. means for moving said cam member manually about said pair of intersecting axes,
      4. first cam restraining means serving to prevent outward movement of said cam member,
      5. second cam restraining means serving to prevent inward movement of said cam member, said second cam restraining means comprising:
         i. at least three cam follower members engageable with said cam member,
      6. a pair of valve members respectively actuated by a pair of said cam follower members and adapted to establish fluid communication between said sources of hot and cold water and a spigot,
      7. said third cam follower member being constantly in engagement with said cam member and serving to counterbalance the forces on said cam member by said pair of cam follower members and to prevent an inadvertent change of position of said cam member,
      8. mixing chamber means within said cartridge member located downstream from and in fluid communication with said pair of valve members,
   e. and spigot means in fluid communication with said mixing chamber means.

2. A single lever mixing faucet construction as defined in claim 1 wherein said pair of valve members are mounted vertically in side-by-side relationship and said cartridge member is provided with means to permit vertical adjustment of said valve members when said cartridge is assembled within said underbody member.

3. A single lever mixing faucet construction as defined in claim 2 wherein each of said valve members is provided with a vertically extending stem member and said pair of cam follower members are threadedly secured to a respective one of said stem members.

4. A single level mixing faucet construction as defined in claim 3 wherein said pair of cam follower members are spring mounted.

5. A single lever mixing faucet construction as defined in claim 1 wherein said first cam restraining means includes a cap member having a central opening through which said means for moving said cam member extends and with said cap member and said cam member having mating arcuate surface portions which permit the substantially universal movement of said cam member about said pair of intersecting axes.

6. A single lever mixing faucet construction as defined in claim 5 wherein said cartridge housing member is substantially cylindrical in cross section and said cap member is clamped atop the upper edge of said cylindrical cartridge housing member.

7. A single lever mixing faucet construction as defined in claim 6 wherein said cap member includes means to orient said cap member both with respect to said cam member and to said cylindrical cartridge housing member.

8. A single lever mixing faucet construction as defined in claim 7 wherein said cap member and said cam member carry cooperating male and female members in the form of a projecting male member and a slot to orient said cap member with respect to said cam member.

9. A single lever mixing faucet construction as defined in claim 5 wherein said means for moving said cam member includes a lever member which extends through said central opening in said cap member and wherein said central opening is substantially rectangular in plan view whereby said mixing faucet may be turned on and off at a substantially constant temperature by straight reciprocatory movement of said lever member.

10. A single lever mixing faucet construction as defined in claim 1 wherein said underbody member is molded from a plastic material and provided with at least three separate and distinct internal passageways, said combination further including an adapter member molded from a plastic material and provided with separate and distinct internal passageways which are in axial alignment with the passageways in said underbody member,
 a. means for orienting said adapter member with said underbody member to align said internal passageways,
 b. and means for securing said adapter member to said underbody member.

11. A single lever mixing faucet construction as defined in claim 10 including sealing ring means retained between the interface of said underbody member and said adapter member to effect sealing between the mating internal passageways of said underbody member and said adapter member.

12. A single lever mixing faucet construction as defined in claim 11 wherein said adapter member has a substantially cylindrical body portion and outwardly diverging lower leg members each in fluid communication with one of the internal passageways in said adpater member.

13. A single lever mixing faucet construction as defined in claim 12 including web bracing means between the adjacent lower leg members of said adapter member.

14. A single lever mixing faucet contruction as defined in claim 12 including a diverter valve member positioned in said cartridge member being said mixing chamber means and said spigot means and wherein two of said lower leg members are connected as inlets for the sources of hot and cold water and a third lower leg member provides an outlet means from said diverter valve member to a sink spray means.

15. A removable cartridge construction for use in connection with a single lever mixing faucet comprising:
 a. a cartridge housing member,
 b. a cam member mounted within said cartridge housing member for substantially universal motion about a pair of intersecting axes,
 c. a lever member attached to said cam member,
 d. a cap member retained at one end of said cartridge housing member,
  1. said cap member contacting said cam member and serving to prevent outward movement of said cam member,
  2. said cap member having an opening through which said lever member extends,
 e. a pair of cam follower means engageable with said cam member,
 f. a pair of valve members respectively actuated by one of said pair of cam follower means,
 g. and a compensating cam follower member constantly in engagement with said cam member,
  1. said compensating cam follower member serving to counterbalance the forces exerted on said cam member by said pair of cam follower means and to prevent an inadvertent change of position of either of said lever member or said cam member.

16. A removable cartridge construction as defined in claim 15 wherein said pair of cam follower members and said compensating cam follower member are spring loaded.

17. A removable cartridge construction as defined in claim 15 wherein said opening in said cap member is rectangular in plan view whereby said mixing faucet may be turned on and off at a substantially constant temperature by straight reciprocatory movement of said lever member.

18. A removable cartridge construction as defined in claim 15 wherein said cap member and said cam member carry cooperating male and female members in the form of a projecting male member and a slot to orient said cam member with respect to said cap member.

19. A removable cartridge construction as defined in claim 15 wherein each of said pair of cam follower means is threadedly received on a stem member of said valve members and includes means to thread said cam follower means up and down on said stem member to compensate for wear and for any accumulation of tolerance variations on the components making up said valve cartridge.

20. A removable cartridge construction as defined in claim 19 wherein said means to thread said cam follower means up and down on said stem member includes aligned openings in said pair of cam follower members and said cap member to permit passage of a tool member therethrough.

21. A removable cartridge construction as defined in claim 15 wherein said cam member, said pair of cam follower means, said cap member, said compensating cam member, and said cartridge housing member are all made from plastic material.

22. A single lever faucet construction having means to compensate for both tolerance variations of parts and for wear of parts comprising:
 a. a fixedly mounted underbody member having an open-mouthed socket at one end adapted to receive a removable cartridge therein,
  1. said underbody member being in fluid communication with sources of hot and cold water,
 b. a removable cartridge member at least partially received in said socket of said underbody member,
 c. means for retaining said removable cartridge member in said socket of said underbody member,
 d. said removable cartridge member comprising:
  1. a cartridge housing member,
  2. a cam member mounted within said cartridge housing member for substantially universal motion about a pair of intersecting axes,
  3. means for moving said cam member manually about said pair of intersecting axes,
  4. first cam restraining means serving to prevent outward movement of said cam member,
  5. second cam restraining means serving to prevent inward movement of said cam member, said second cam restraining means comprising:

i. at least three cam follower members engageable with said cam member,
6. a pair of valve members respectively actuated by a pair of said cam follower members and adapted to establish fluid communication between said sources of hot and cold water and a spigot,
   i. said pair of valve members being mounted vertically in side-by-side relationship,
   ii. each of said valve members being provided with a vertically extending stem member each of which has one of said pair of cam follower members threadedly secured thereto,
   iii. means for providing access to said stem members to permit vertical adjustment of said pair of cam follower members with respect to said stem members when said cartridge member is received in said underbody member,
7. said third cam follower member being constantly in engagement with said cam member and serving to counterbalance the forces on said cam member by said pair of cam follower members and preventing an inadvertent change of position of said cam member,
8. mixing chamber means within said cartridge member located downstream from and in fluid communication with said pair of valve members,
e. and spigot means in fluid communication with said mixing chamber means.

23. A single lever mixing faucet construction as defined in claim 22 wherein said first cam restraining means includes a cap member having a central opening through which said means for moving said cam member extends and with said cap member and said cam member having mating arcuate surface portions which permit the substantially universal movement of said cam member about said pair of intersecting axes.

24. A single lever mixing faucet construction as defined in claim 23 wherein said pair of cam follower members are each provided with a tool-admitting aperture and said cap member is provided with additional apertures in line with the apertures in said cam follower members to permit the insertion of tool means in order to effect vertical adjustment of said pair of cam follower members with respect to said cam member.

* * * * *